United States Patent
Feng et al.

(10) Patent No.: US 11,215,093 B2
(45) Date of Patent: Jan. 4, 2022

(54) CONTROL SYSTEM FOR A VALVE

(71) Applicant: IVEX PTY LTD, Melbourne (AU)

(72) Inventors: Zhanzhao Feng, Melbourne (AU);
Jesse Kovac, Melbourne (AU)

(73) Assignee: IVEX PTY LTD, Milperra (AU)

( * ) Notice: Subject to any disclaimer, the term of this patent is extended or adjusted under 35 U.S.C. 154(b) by 0 days.

(21) Appl. No.: 16/350,519

(22) PCT Filed: May 24, 2017

(86) PCT No.: PCT/AU2017/050486
§ 371 (c)(1),
(2) Date: Nov. 28, 2018

(87) PCT Pub. No.: WO2017/201576
PCT Pub. Date: Nov. 30, 2017

(65) Prior Publication Data
US 2021/0010401 A1  Jan. 14, 2021

(30) Foreign Application Priority Data
May 27, 2016 (AU) ................................ 2016902017

(51) Int. Cl.
*F01N 1/16* (2006.01)
*F01N 9/00* (2006.01)
(Continued)

(52) U.S. Cl.
CPC ............... *F01N 1/165* (2013.01); *F01N 9/00* (2013.01); *F02D 9/04* (2013.01); *G01S 19/42* (2013.01);
(Continued)

(58) Field of Classification Search
USPC .......................................................... 701/99
See application file for complete search history.

(56) References Cited

U.S. PATENT DOCUMENTS 6,508,214 B1 * 1/2003 Uchida ............... F02D 13/0284
123/65 PE
8,384,528 B2  2/2013 McCarthy et al.
(Continued)

FOREIGN PATENT DOCUMENTS

WO     2004036001 A1    4/2004
WO     2007027793 A1    3/2007

OTHER PUBLICATIONS

Exhaust Valve Control (EVC) Module [retrieved Aug. 6, 2021] retrieved from the internet. <URL: htps://web.archive.org/web/20160329091255/http://machtschnell.com/exhaust-valveÂ-control-evc-module.html> published Mar. 5, 2015 as per Wayback Engine Whole document.
(Continued)

*Primary Examiner* — Tyler D Paige
(74) *Attorney, Agent, or Firm* — Panitch Schwarze Belisario & Nadel LLP

(57) ABSTRACT

The preferred invention is directed to a controller for a vehicle exhaust valve. The controller comprises a vehicle interface for determining a live value for an operating parameter of a vehicle, a recording module being configured to, upon activation, instantaneously record the live value of the operating parameter, and a programming module for determining a value range based on the recorded live value and allowing a desired position of the valve to be set such that during operation, the control system automatically moves the valve to the desired position when the operating parameter is within the value range.

19 Claims, 5 Drawing Sheets

(51) Int. Cl.
 *G01S 19/42* (2010.01)
 *G07C 5/00* (2006.01)
 *G07C 5/08* (2006.01)
 *F02D 9/04* (2006.01)

(52) U.S. Cl.
 CPC ............ *G07C 5/006* (2013.01); *G07C 5/085* (2013.01); *G07C 5/0808* (2013.01); *G07C 5/0825* (2013.01); *F01N 2900/08* (2013.01); *F01N 2900/10* (2013.01); *F02D 2200/101* (2013.01); *F02D 2200/501* (2013.01); *F02D 2200/701* (2013.01)

(56) References Cited

U.S. PATENT DOCUMENTS

| | | | |
|---|---|---|---|
| 2003/0145584 A1 | 8/2003 | Ciray | |
| 2003/0145585 A1 | 8/2003 | Uhler et al. | |
| 2003/0221663 A1* | 12/2003 | Vanderpoel | F02M 26/01 123/321 |
| 2008/0078167 A1* | 4/2008 | Wang | F01N 3/00 60/285 |
| 2010/0132339 A1* | 6/2010 | Barkhage | F01N 3/0235 60/287 |
| 2013/0232952 A1* | 9/2013 | zur Loye | F02D 41/006 60/274 |
| 2014/0109868 A1* | 4/2014 | Zhu | F02D 41/0052 123/349 |
| 2016/0123210 A1 | 5/2016 | Dmytrow et al. | |
| 2017/0145965 A1* | 5/2017 | Singh | F01N 13/008 |
| 2019/0120101 A1* | 4/2019 | Dadam | F01N 11/00 |
| 2019/0176810 A1* | 6/2019 | Dudar | F02D 41/221 |

OTHER PUBLICATIONS

International Search Report issued Sep. 14, 2017 in International Application No. PCT/AU2017/050486.
International Preliminary Report on Patentability issued Sep. 28, 2018 in International Application No. PCT/AU2017/050486.

* cited by examiner

CONTROL SYSTEM FOR A VALVE

CROSS-REFERENCE TO RELATED APPLICATIONS

The present application is a Section 371 of International Patent Application No. PCT/AU2017/050486, filed May 24, 2017 and entitled "Control System for a Valve" and claims the benefit of Australian Patent Application No. 2016902017, filed on May 27, 2016 and titled "Control System for a Valve," the entire contents of which are incorporated herein by reference in their entirety.

BACKGROUND OF THE INVENTION

The invention described herein relates to a control system for a valve. In particular, embodiments of the invention are directed to a control system for a vehicle muffler exhaust valve.

Mufflers can be used to reduce noise emissions from vehicle exhaust systems by providing a series of perforated conduits which work together to provide deconstructive interference of sound waves. An improved muffler assembly is described in Australian Patent No. 2007283449, the entire contents of which are incorporated herein by reference.

Whilst mufflers can reduce noise emissions by redirecting exhaust gasses from the engine, they can also create back-pressure to the engine. This can undesirably lead to an increase in emissions and fuel consumption, and can negatively impact engine performance.

Recently developed muffler assemblies typically have a butterfly valve, the angle of which can be varied to control the amount of sound attenuation and backpressure of the muffler to suit different applications.

The present invention provides a control system for a valve, such as a valve of a vehicle muffler, which is easy and convenient to setup and use.

BRIEF SUMMARY OF THE INVENTION

According to one aspect of the invention, there is provided a controller for a vehicle exhaust valve, the controller comprising a vehicle interface for determining a live value for an operating parameter of the vehicle, a recording module being configured to, upon activation, instantaneously recording the live value of the operating parameter, and a programming module for determining a value range based on the recorded live value and allowing a desired position of the valve to be set such that during operation, the controller automatically moves the valve to the desired position when the operating parameter is within the value range.

Advantageously, the control system allows a user to easily and conveniently set the valve to any desired position during operation of the vehicle. The determination and recording of a live value of the operating parameter further allows the user to pinpoint the exact moment during operation of the vehicle during which to set the valve to the desired position so as to provide the required sound attenuation and/or minimize the amount of back pressure to the engine. In this manner, future operation of the valve can be automatically governed by that setting.

Preferably, the recording of the live value by the recording module can be activated by a single motion of a user. For example, the recording may be activated by a single button of the control system. In particular, the recording may be activated by a user's touch of a button on a visual interface of the control system.

Any operating parameter associated with the vehicle's performance characteristics may be used. The vehicle interface may determine a live value of two or more operating parameters. For example, the operating parameters may include one or more of Revolutions Per Minute (RPM), Throttle, and Speed in any combination.

In one embodiment, the vehicle interface determines a live value for each one of the operating parameters Revolutions Per Minute (RPM), Throttle, and Speed; and upon activation, the recording module instantaneously records the live value of each of the operating parameters. The programming module may determine a value range based on each of the recorded live values and allow a desired position of the valve to be set when each of the operating parameters are within their respective value ranges. In addition, the programming module may allow a desired position of the valve to be set when any of the operating parameters are outside its determined value range.

Typically, the programming module determines a value range covering values slightly above and below the recoded live value. The value range may be any suitable size. In some embodiments, the value range covers values roughly ten percent (10%) above and below the recorded live value. The programming module may also allow manual user adjustments of the value range.

In some embodiments, the programming module may allow creation of one or more operating profiles, each operating profile allows a desired valve position to be set for value ranges of one or more recorded operating parameters so that when an operating profile is enabled, the control system generates control signals to automatically move the valve to the set desired position when the one or more operating parameters are each within the respective value ranges.

In some embodiments, the control system may allow two or more operating profiles to be enabled simultaneously.

In practice, each operating profile may correspond to a specific location, area or driving application. For instance, one operating profile may correspond to commuting in and around the central business district ("CBD"), in which the valve can be set to one hundred percent (100%) closed or near one hundred percent (100%) closed when the vehicle is operating at low to medium, rotations per minute ("RPM"), throttle and speed that is typical of inner city and residential area driving so as to minimize noise from the exhaust. Another operating profile corresponding to high speed driving on the motorway, in which it is desired to minimize back pressure to the engine and a higher level of exhaust noise may be permitted, may have the valve position set to one hundred percent (100%) open or near one hundred percent (100%) open when the vehicle is operating at a higher values for RPM, throttle and speed. Conveniently, the desired valve positions can be set with the assistance of a passenger whilst the vehicle is being driven so that the exact combination of operating parameters can be easily captured.

The programming module may allow a user to fine tune the value range of each operating parameter via a visual interface. The visual interface may provide a sliding scale to allow fine tuning of the value range for each operating parameter.

The programming module may allow the setting of the valve position using percentages. In particular, a zero percent (0%) position may correspond to a fully closed position of the valve, and a one hundred percent (100%) position may correspond to a fully open position of the valve.

In one embodiment, the control system may further include a geographic module for allowing a desired valve position to be set based on the geographic location of the vehicle. More specifically, the control system may include a global positioning system ("GPS") device for determining the geographic location of the vehicle.

In one example, the geographic module may allow a desired valve position to be set when the vehicle is travelling within a predetermined area. In particular, the predetermined area may be defined by circular area having a desired radius from a specific location. Alternatively, the predetermined area may be along a defined street or route.

The control system may further include a manual operation module which allows manual position changes of the valve. For example, the manual operation module may allow a user to specify the position of the valve via a visual interface. Upon receipt of the valve position, the control system may send a control signal to move the valve to the desired position. In another example, manual operation module may provide an 'Open' and 'Closed' button via a user interface, such that when a user holds the Open or Closed button, a control signal is continuously sent from the controller to move the valve towards an open or closed position respectively, until the user is no longer holding the button or when an end position of the valve is reached.

Preferably, the control system includes a control software application for receiving and processing recorded live values of operating parameters, and generating operating instructions based on user input, a mobile device on which the control software application can be installed for operation, the control software application being configured to provide a user interface via the mobile device for receiving user input, a control circuit module providing the vehicle interface and communicating with the mobile device to relay operating parameter values and receive operating instructions, the control circuit module being configured to generate control signals to drive the valve to the desired positions based on the operating instructions.

The control circuit module includes a microcontroller for receiving input signals from the mobile device and vehicle, processing the input signals based on embedded executable software commands, and generating output signals to the mobile device and to drive the valve.

The control circuit module may include a GPS device for determining a geographic location of the valve. The GPS device is on board the control circuit module and provides GPS signals directly to the microcontroller. Advantageously, providing a GPS device on board the control circuit module avoids reliance on GPS functionality of off-the-shelf mobile devices. In particular, some inbuilt GPS functions of some mobile devices may provide low accuracy location signals, may not provide reliable functionality, and could also undesirable increase battery power usage of the mobile device.

The system may further include a diagnostics module for facilitating testing, maintenance, troubleshooting and repair of the system. The diagnostics module may be hosted by the microcontroller. The control circuit module may include visual and/or audio indicators to facilitate testing, maintenance, troubleshooting and repair of the system in conjunction with the diagnostics module.

The diagnostics module may provide functionality to report error status, confirm power fail, report external switch state, access user menu settings, access battery system settings, access vehicle interface communication protocol settings.

The mobile device may communicate with the control circuit module in any suitable manner. For example, the system may employ wireless and/or wired communication between the controller and the control circuit.

The vehicle interface may determine the operating parameters from a communications port of the vehicle. The vehicle interface may be hard wired to the communications port. In some embodiments, the vehicle interface may communicate with the port wirelessly, for example via Bluetooth.

The system may further include a manual remote control, the manual control device having a button such that upon activation of the button, a control signal is sent to the control circuit module actuate movement of the valve.

The system may further include a wired control device. The operation of the manual control and/or wired device may be instantaneously synchronized with the user interface of the mobile device. Such operations may include the change of the valve position, and change of the operation mode. For instance, a change of valve position affected by the wired and/or wireless control device will be displayed instantaneously on the user interface of the mobile device; and a selection of the operating mode may also be instantaneously reflected on the user interface of the mobile device.

The valve may be a butterfly valve. In particular, the valve may be a butterfly valve in a muffler assembly.

According to another aspect of the invention, there is provided a method for controlling a vehicle exhaust valve, the method comprising determining a live value for an operating parameter of the vehicle, instantaneously recording the live value of the operating parameter, determining a value range based on the recorded live value, setting a desired position for the valve, and automatically moving the valve to the desired position when the operating parameter is within the value range.

In order that the invention may be more readily understood and put into practice, one or more preferred embodiments thereof will now be described, by way of example only, with reference to the accompanying drawings.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristic described herein may be combined in any suitable manner in one or more combinations.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
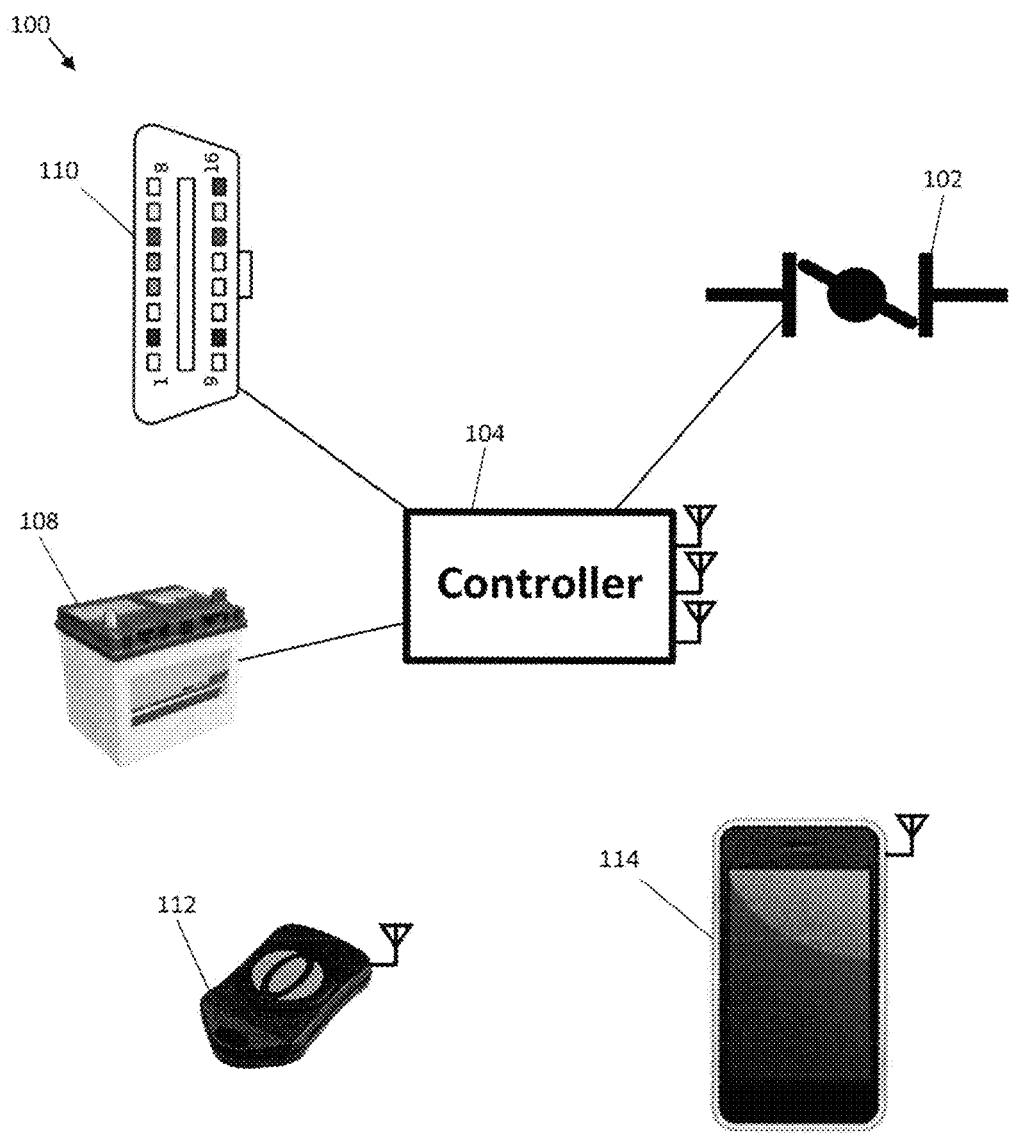
FIG. 1 is a schematic diagram of a control system for an exhaust valve according to one embodiment of the invention.

Certain terminology is used in the following description for convenience only and is not limiting. Unless specifically set forth herein, the terms "a", "an" and "the" are not limited to one element but instead should be read as meaning "at least one". The words "right," "left," "lower," and "upper" designate directions in the drawings to which reference is made. The words "inwardly" or "distally" and "outwardly" or "proximally" refer to directions toward and away from, respectively, the geometric center or orientation of the device and instruments and related parts thereof. The terminology includes the above-listed words, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIGS. 1-5, a control system 100 for a vehicle exhaust valve 102 is illustrated in FIG. 1. The system 100 includes a control circuit module 104 having a microcontroller for receiving and processing input signals and generating control signals to move the valve 102 between open and closed positions. Executable control software commands embedded in the microcontroller and governing the manner in which the input signals are received and processed, and how control signals are generated will be discussed in further detail below.

The valve 102 is a butterfly valve associated with a vehicle muffler (not shown) and controls the flow of exhaust gases through the muffler. In a completely closed position, the valve 102 redirects flow of exhaust gases through a noise cancelling chamber of the muffler so as to provide maximum noise attenuation, which also generates maximum back pressure to the engine. In a completely open position, the valve 102 allows the gasses to bypass the noise cancelling chamber to provide minimum noise attenuation by the muffler, which also allows back pressure to the engine to be minimized. A direct current ("DC") motor (not shown) actuates movement of the valve 102.

The control circuit module 104 can be powered by a power source 108 of the vehicle. In some embodiments, the power source 108 may be provided by a 12V DC auxiliary outlet, such as a cigarette lighter connector, of the vehicle. In some embodiments, the control circuit module 104 may be hard wired via an accessory power or battery power cable of the vehicle.

The control circuit module 104 generates control signals to drive the valve 102 based on operating parameters of the vehicle determined via communications port 110 of the vehicle. The microcontroller includes a vehicle interface for communication with port 110. In particular, the communications port 110 may be an On-board diagnostics port (e.g. OBD-II) of the vehicle. The control circuit module 104 may be fitted with an OBD-II interpreter for compatibility with certain vehicles.

The system 100 further includes a remote control device 112 having manual buttons which can be used to move the valve 102 between its open and closed positions. For instance, the remote control device 112 may have an Open button and a Close button, upon activation of either button, the control circuit module 104 generates corresponding signal to move the valve 102 to an open or closed position. The remote control device 112 typically operates on a radio frequency of 433 MHz.

The system 100 further includes software control application installed on a mobile device 114. The mobile device 114 can communicate with the controller circuit module 104 wirelessly via WiFi and/or Bluetooth. When the remote control device 112 is used to change the valve 102 position, the position will be recorded by the controller circuit module 104 and synchronized to other interface devices, such as the mobile device 114. More than one mobile device 114 may be included in the system 100.

Operation of the software control application will now be explained in more detail with reference to FIGS. 2 to 4. The software control application provides a user interface via the mobile device 114 to receive user input signals to govern the control of the valve 102 via wireless communication with the control circuit module 104.

Figure 3:
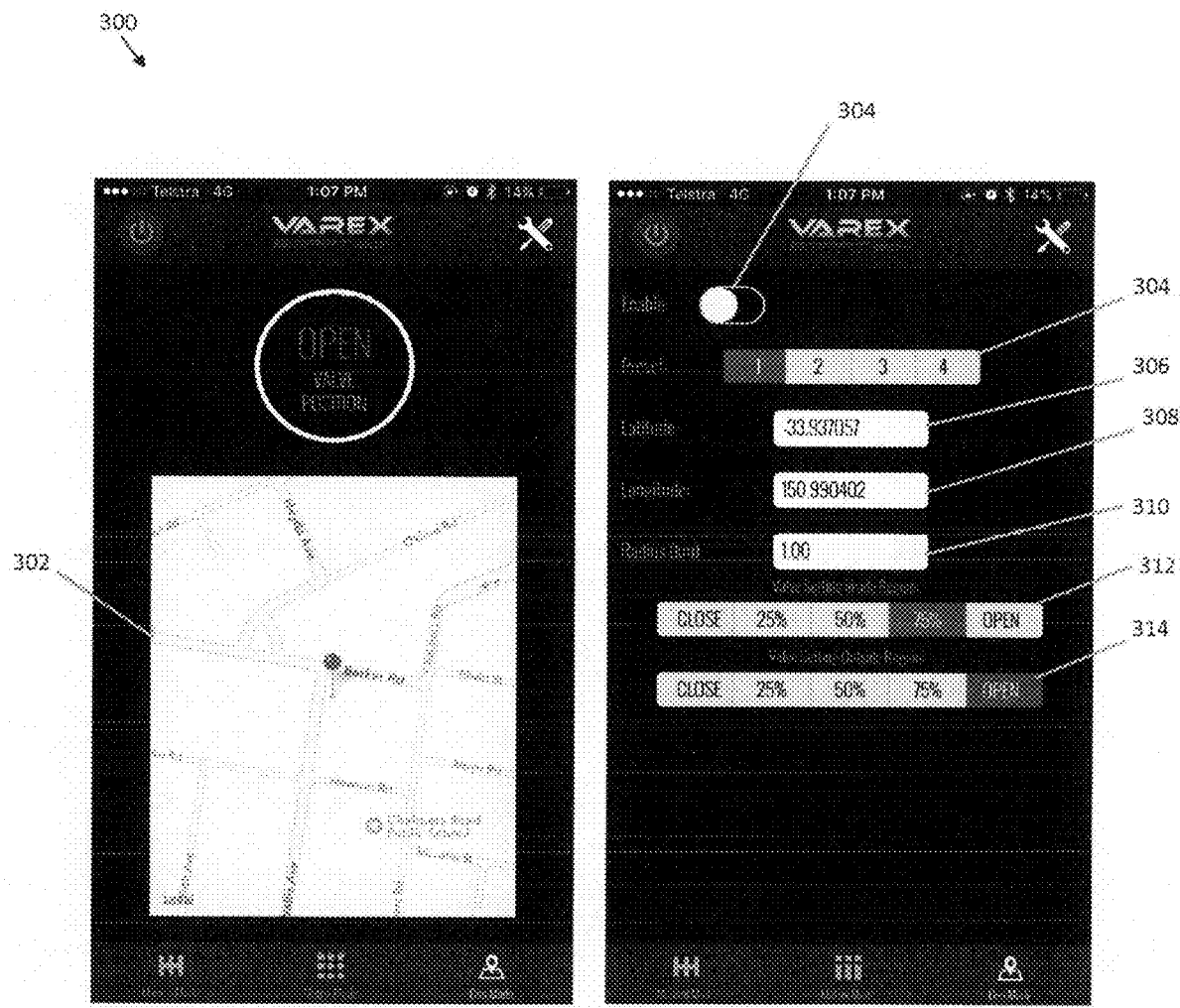
Figure 4:
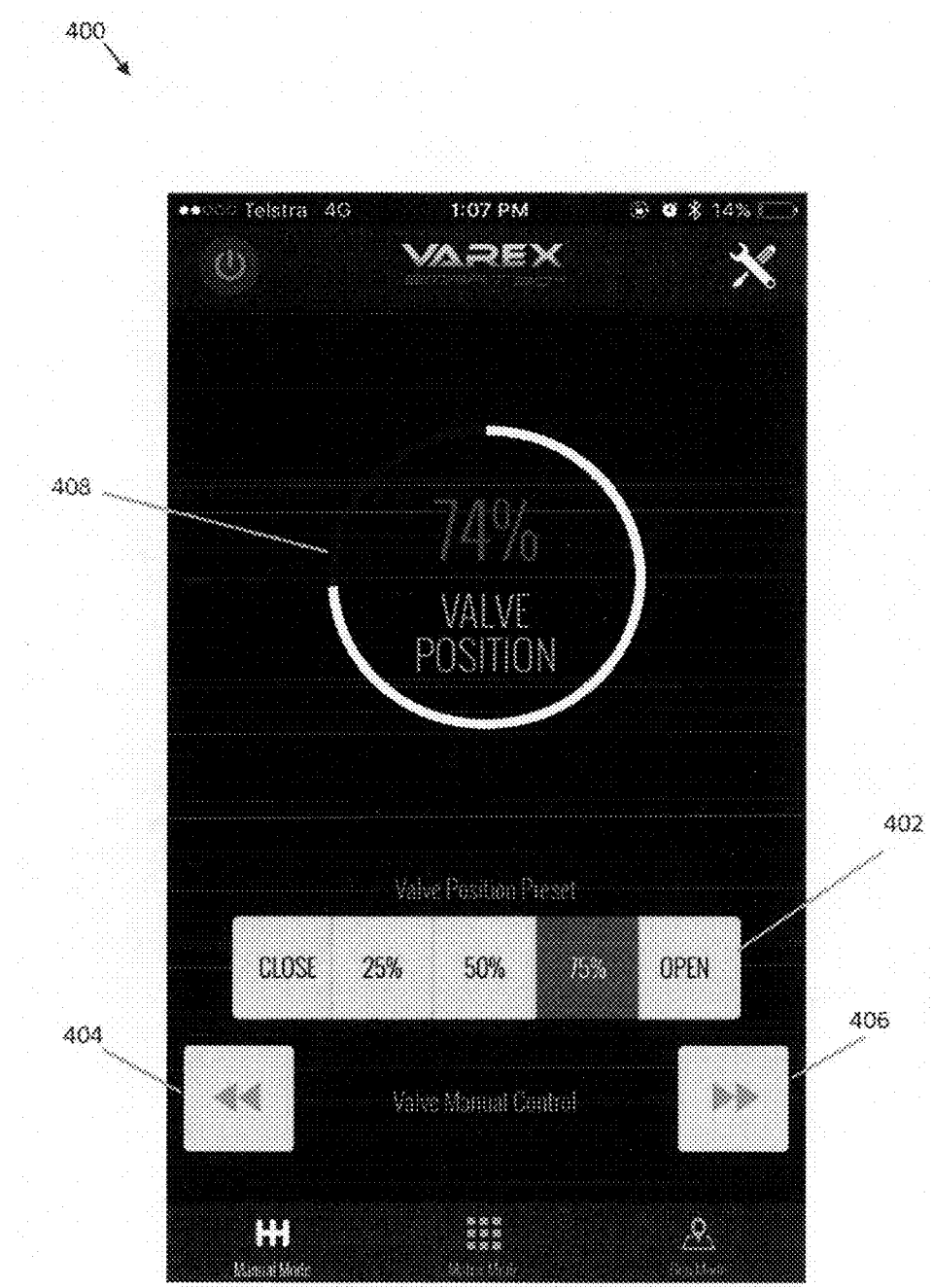

In the embodiment shown, the software control application provides three different modes of operation—custom mode 200 (FIG. 2), geographic mode 300 (FIG. 3) and manual mode 400 (FIG. 4).

Figure 2:
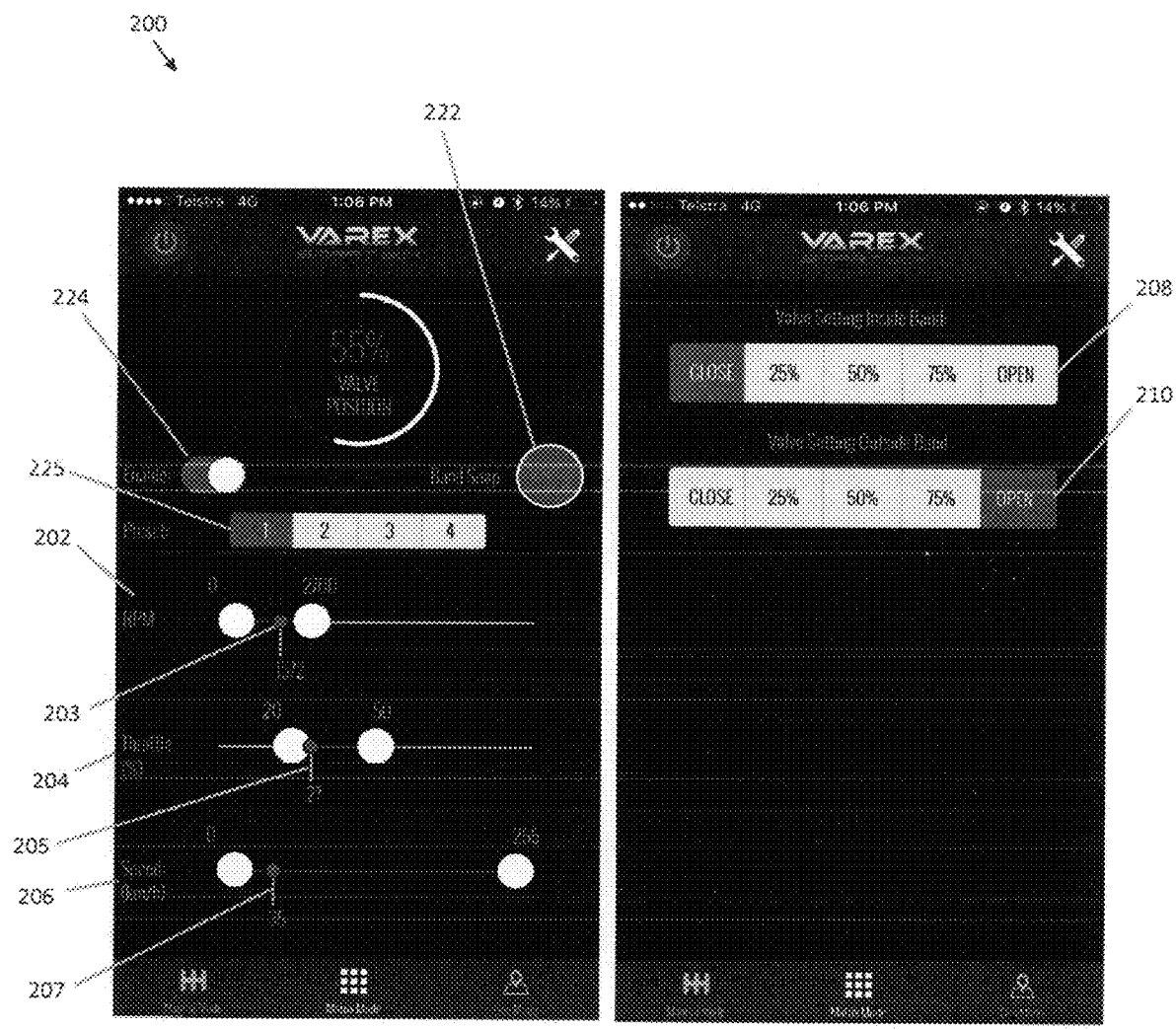
FIGS. 2 to 4 illustrate screenshots of various displays of a user interface as provided by a mobile device of the preferred control system of FIG. 1.

FIG. 2 illustrates two screenshot views of a user interface of the control application when custom mode 200 has been selected. A user can navigate between the two views by scrolling the user interface up and down. The custom mode 200 allows a desired valve position to be set based on a desired value range of one or more operating parameters. In the embodiment shown, the operating parameters includes Revolutions per Minute ("RPM") 202, throttle 204, and speed 206. When operating in custom mode 200, the vehicle interface of the control circuit module 104 determines a value for each operating parameter via communications port 110, for example, at a sampling rate of 2 samples per second. The detected values are then sent to the mobile device 114 wirelessly for display on a respective sliding scale 203, 205, 207 of the user interface 200. Any suitable visual indication may be used to display the value ranges. In the embodiment shown, a sliding scale is used for displaying the detected value 203, 205, 207 for each operating parameter 202, 204, 206.

Once the operating parameters 202, 204, 206 reach the desired value during operating of the vehicle, a user can use the record button 222 to instantaneously record a live value 203, 205, 207 of each of the parameters 202, 204, 206. The control software application automatically provides a value range closing surrounding each of the recorded live values 203, 205, 207. The sliding scale also allows manual adjustment and/or fine tuning of the desired value range before setting the desired valve positions.

Once the desired operating parameter value ranges 202, 204, 206 are determined, pre-set position bar 208 can be used to set the valve position when all operating parameters are within the specified value range; and pre-set position bar 210 can be used to set the valve position when any one of the operating parameters are outside the specified value range. The user interface 200 expresses the valve position in percentages. For example, a valve position of CLOSED zero percent (0%) corresponds to a fully closed position, twenty-five percent (25%) corresponds to a one-quarter (¼) open position, fifty percent (50%) corresponds to a one half (½) open position, seventy-five percent (75%) corresponds to a three quarters (¾) open position, and OPEN one hundred percent (100%) corresponds to a fully open position. In the event that a user wishes to disregard a particular operating parameter, the corresponding sliding scale may be set to specify the entire value range for that operating parameter. For example, if the user wishes to disregard RPM, the value range for RPM may be set to zero to ten thousand (0 to 10,000) RPM.

Typically, the setting of the parameter and valve values in custom mode 200 will be carried out with the assistance of a passenger whilst a driver is driving the vehicle. Whilst the vehicle is in motion, the driver and passenger will take note of the exact moment that it would be desirable for the amount of exhaust sound attenuation or engine back pressure to change. For example, the driver may wish for the engine back pressure to decrease as the vehicle accelerates onto a high speed motorway, where a higher level of exhaust noise may be permissible. In this scenario, the driver and passenger will take note of when the vehicle is accelerating onto a motorway and the passenger will instantaneously record the live values for the operating parameters via a single touch of the record button 222. Once the live values are captured, a value range for each operation parameter is determined by the application, and the exact value ranges can be manually manipulated via sliding scale for each parameter 202, 204, 206. Once the value range for each parameter is finalized, the pre-set position bars 208, 210 can be used to set the desired valve positions. The enable button 224 allows a user to selectively enable to disable operation of control application in custom mode 200.

In one example, the following operating parameter value ranges and valve positions may be setup in custom mode:
  RPM (202): 2000 to 5000
  Throttle (204): 40% to 80%
  Speed (206): 20 to 100 (km/h)
  Valve Setting outside Band (208): 75%
  Valve Setting Inside Band (210): Closed In the above example, the valve 102 will be in the seventy-five percent (75%) open position if the vehicle is travelling at fifty kilometers per hour (50 km/h), with an RPM of fifteen hundred (1500) and fifty percent (50%) throttle; and the control circuit module 104 will automatically move the valve 102 to a Closed position, for example, if the vehicle's RPM increased to a value between two thousand and five thousand (2000 and 5000) and the remaining operating parameter values remained within the predetermined value ranges above.

In some embodiments, one or more operating profiles may be created, each operating profile allowing a desired valve position to be set for value ranges of one or more recorded operating parameters so that when an operating profile is enabled, the control system generates control signals to automatically move the valve to the set desired position when the one or more operating parameters are each within the respective recorded value ranges.

As shown in FIG. 2, menu 225 allows a user to set four (4) different operating profiles. Each operating profile provides a pre-set desired value range for each operating parameter 202, 204, 206 and associated valve positions 208, 210, which can be set up in the same manner as described above.

In some embodiments, the control system 100 may allow two or more operating profiles to be enabled simultaneously. The control system 100 may also allow a user to assign priority to the multiple enabled operating profiles and/or individual pre-set operating parameter value ranges. In the event that pre-set value ranges of operating parameters overlap between the enabled operating profiles, the controller 104 will control the valve position 102 in accordance with the pre-set operating parameter value range and/or operating profile assigned with the highest priority.

Now referring to FIG. 3 in which two screenshot views of a user interface for a geographic mode 300 of the control application is shown. A user can navigate between the two views by scrolling the user interface screen up and down. The geographic mode 300 allows a user to set the valve 102 to a desired position based on a geographic location of the vehicle. In particular, the control circuit module 104 includes a GPS device for determining a current geographic location of the vehicle and the valve 102 can be set to a desired position when the vehicle is travelling inside or outside a predefined area. During operation of the geographic mode, the GPS value from the on board GPS device of the control circuit module 104 is continuously sent to the microcontroller for comparison with pre-set geographic values to determine whether a control signal is to be generated to drive the valve 102.

The user interface 300 allows the user to select the desired location by navigating map 302. Alternatively, an in-built GPS of the mobile device 114 and/or the GPS device of the control circuit module 104 may be used to determine a current position of the vehicle for display via the map 302, and the user may select the current position. The control software application automatically generates the latitude 206 and longitude 308 of the selected location 302. The user can then set the predefined area by defining a radius 310 from the selected location. The predefined area is therefore a circular area having a center at the selected location 302 and having a radius as defined by field 310. The desired valve positions for when the vehicle is within the predefined area and when the vehicle is outside the predefined area can be set using respective pre-set position bars 312, 314 by selecting the valve position.

In one example, user defined parameters for operating in geographic mode 300 is as follows:
  Latitude (Sydney, NSW): −33.8674769
  Longitude (Sydney, NSW): 151.2069775
  Radius: 10 km
  Valve Setting Inside Region: Closed
  Valve Setting Outside Region: Open In the above example, the valve 102 will be in a fully closed position if the vehicle is travelling within ten kilometers (10 kms) of Sydney CBD, and the valve will automatically move to a fully open position when outside this region.

The control application may be configured to allow the geographic mode 300, the custom mode 200 and/or the manual mode 400 to be enabled concurrently. In one embodiment, geographic mode will have higher execution priority than the other two modes when all modes are enabled and triggered. For example, the geographic mode 300 can be used to set the valve position to closed once the vehicle is within 1 km of the user's home. The geographic mode 300 may be given priority over the custom mode 200 such that when the vehicle is outside this home area, the valve position changes according to the set parameter value ranges. However, once the vehicle moves within the home area, the valve will always change to the closed position so as avoid neighborhood disturbance to keep the exhaust sound to a minimum level.

Now referring to FIG. 4 in which a user interface 400 for a manual mode is shown. In manual mode 400 a user is able to select the desired valve position via a pre-set position bar 402. The user may also touch and hold Open 406 and Close 404 buttons until the valve moves to a desired position. The current position of the valve can be displayed on the screen 408.

Figure 5:
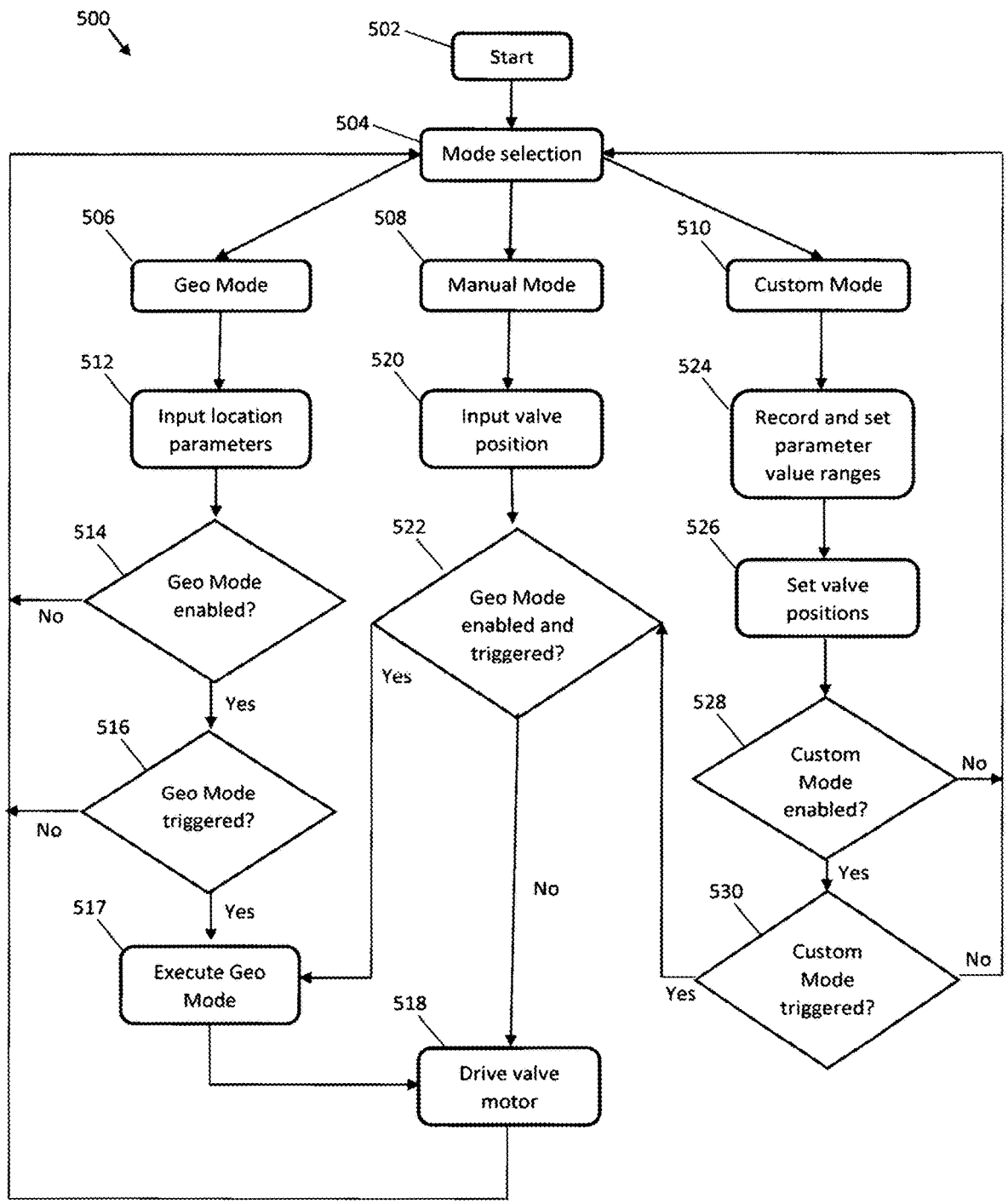
FIG. 5 is a flow diagram illustrating a method of controlling an exhaust valve using the system of FIG. 1 according to an embodiment of the invention.

A method 500 of controlling the exhaust valve 102 will now be described with reference to FIG. 5.

At method step 502, the control application installed on a user's mobile device 114 is initiated.

At method step 504, the user selects the mode of operation. If the user selects geographic mode 300, the method 500 proceeds to step 506. If the user selects manual mode 400, the method 500 proceeds to step 508. If the user selects custom mode 200, the method 500 proceeds to step 510.

At step 506, the user selects geographic mode 300 and the corresponding user interface (FIG. 3) is displayed via the mobile device display.

At step 512, the user selects a starting location (e.g. Sydney CBD) and radius (e.g. 10 km) from the starting location to define a desired area. The control application may allow the user to enter the starting location by entering a street address, searching using keywords, or via manual navigation of the map (FIG. 3). The entered parameters are saved in the geometric mode 300 of the control application until each of the values are changed.

At query step 514, the control application determines whether the geometric mode has been enabled. If so, the method 500 proceeds to step 516. If not, the method 500 returns to step 504.

At query step 516, the control application determines whether the geometric mode 300 has been triggered based on the parameters entered in step 512. If the vehicle is travelling from a location within the defined area to a location outside the defined area, or vice versa, the geometric mode 300 is triggered, and the method 500 proceeds to step 518. If the vehicle is travelling within or outside the defined area, the geometric mode 300 is not triggered, and the method 500 returns to step 504. To determine whether the geometric mode 300 is triggered, the actual location of the vehicle is determined by the on board GPS device of the control circuit module 104. The control application compares the actual location determined by the GPS device and compares it with the location parameters set in step 512 to determine whether the vehicle is changing from a location inside the defined area to a location outside the defined area, and vice versa. If the geometric mode 300 is triggered the method 500 proceeds to step 517.

At step 517, a notification is sent to the control circuit module 104 to generate a control signal to drive the valve 102 based on the parameters set in step 512.

At step 518, the control circuit module 104 receives a notification and generates a control signal to actuate a DC motor to drive the valve 102 to the appropriate position based on the parameters set in one of the steps 512, 520 or 526.

At step 508, the user selects manual mode 400. The control application generates the manual mode interface for display (see FIG. 4).

At step 520, the user selects the valve position, either via the pre-set position bar 402, or Open and Closed buttons 404, 406. The selected value for the valve position is saved by the control application until a new position is selected. The control application sends a notification to the control circuit module 104 to generate a control signal to drive the valve 102 based on the parameters set in either step 520.

At query step 522, the control application determines whether the geometric mode 300 is enabled and triggered. If the geometric mode 300 is not enabled and triggered, the control circuit module 104 processes the notification received via step 520 or 530 to generate a control signal to drive the valve 102 based on the parameters set in either step 520 or step 526. Each newly received notification overwrites the previously received notification. If geometric mode 300 is enabled and triggered, the method 500 proceeds to step 517. If not, the method 500 proceeds to step 518.

At step 510, the user selects custom mode 200 and the control application generates the corresponding interface for display via the user's mobile device 114 (see FIG. 2). When a driver starts the engine of the vehicle, a vehicle interface or vehicle interface of the control circuit module 104 wakes up from sleep and determines via the vehicle interface whether live values for operating parameters 202, 204, 206 are available from communications port 110. If so, the control circuit module 104 proceeds to sample the operating parameters 202, 204, 206 at a rate of two (2) samples per second. The desired operating parameters 202, 204, 206 are recorded and the associated value ranges are set in the manner as previously described with reference to FIG. 2. The newly set valve positions and conditions for driving the valve in custom mode 300 overwrites previously set valve positions in step 520 (of manual mode operation). The recorded value ranges are saved by the control application until new values are recorded over the previous value ranges by subsequent activation of record button 222.

At step 526, the valve positions 208, 210 are set in the manner as previously described with reference to FIG. 2.

At query step 528, the control application determines whether the custom mode 200 is enabled 224. If so, the method 500 proceeds to query step 530. If not, the method 500 proceeds to query step 522.

At query step 530, the control application determines whether the custom mode 200 is triggered. The control application continuously compares operating parameter live values as sampled by the control circuit module 104 via port 110 to the set value ranges 202, 204, 206 in step 510. If all of the live sampled values are within the corresponding value ranges 202, 204, 206 defined in step 510, the custom mode 200 is triggered. If any of the sampled live values are outside the corresponding value ranges 202, 204, 206 as defined in step 510, custom mode 200 is not triggered. If custom mode 200 is triggered, the method 500 proceeds to query step 522, and if not, the method 500 returns to step 504. If custom mode 200 is triggered, the control application sends a notification to the control circuit module 104 to generate a control signal to drive the valve 102 according to the values set in step 526.

The foregoing embodiments are illustrative only of the principles of the invention, and various modifications and changes will readily occur to those skilled in the art. The invention is capable of being practiced and carried out in various ways and in other embodiments. It is also to be understood that the terminology employed herein is for the purpose of description and should not be regarded as limiting.

The term "comprise" and variants of that term such as "comprises" or "comprising" are used herein to denote the inclusion of a stated integer or integers but not to exclude any other integer or any other integers, unless in the context or usage an exclusive interpretation of the term is required.

Reference to prior art disclosures in this specification is not an admission that the disclosures constitute common general knowledge.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the present disclosure.

The invention claimed is:

1. A control system for an exhaust valve of a vehicle, the control system comprising:
    a vehicle interface for determining a live value for an operating parameter of the vehicle;
    a recording module being configured to, upon activation, instantaneously record the live value of the operating parameter; and
    a programming module for determining a value range based on the recorded live value and allowing a desired position of the valve to be set such that during operation of the vehicle, the control system automatically moves the valve to the desired position when the operating parameter is within the value range, the value range is comprised of a plurality of value ranges and the operating parameter is comprised of one or more operating parameters, the programming module allows creation of one or more operating profiles, each of the one or more operating profiles allowing a desired valve position to be set for the plurality of value ranges of the respective one or more operating parameters associated with each of the one or more operating profile so that when one of the one or more operating profiles is enabled, the control system generates control signals to automatically move the valve to the set desired position when the one or more respective operating parameters are each within the respective one of the plurality of value ranges, the control system allows two or more operating profiles of the one or more operating profiles to be enabled simultaneously.

2. The control system of claim 1, wherein the instantaneous recording is activated by a single motion of a user's touch of a button on a visual interface.

3. The control system according claim 1, wherein the operating parameter is comprised of two or more operating parameters, the vehicle interface determines live values of the two or more operating parameters.

4. The control system of claim 1, wherein the operating parameter is comprised of at least one of Revolutions Per Minute (RPM), Throttle, and Speed.

5. The control system of claim 4, wherein the vehicle interface determines the live value for the operating parameter, the operating parameter comprised of operating parameters including Revolutions Per Minute (RPM), Throttle, and Speed, upon activation, the recording module instantaneously records the live value of each of the operating parameters.

6. The control system of claim 1, wherein the live value is comprised of a plurality of live values and the operating parameter is comprised of a plurality of operating parameters, the programming module determines the value range based on each of the plurality of live values and allows a desired position of the valve to be set when the plurality of operating parameters is within the respective value range.

7. The control system of claim 6, wherein the programming module allows a desired position of the valve to be set when any of the plurality of operating parameters is outside its respective value range.

8. The control system of claim 1, wherein the value range covers values slightly above and below the recoded live value.

9. The control system of claim 1, wherein the programming module further allows manual user adjustments of the value range.

10. The control system of claim 1, further comprising:
    a manual operation module which allows manual position changes of the valve.

11. The control system of claim 1, wherein the valve is a butterfly valve in a muffler assembly of the vehicle.

12. A control system for an exhaust valve of a vehicle, the control system comprising:
    a vehicle interface for determining a live value for an operating parameter of the vehicle;
    a recording module being configured to, upon activation, instantaneously record the live value of the operating parameter; and
    a programming module for determining a value range based on the recorded live value and allowing a desired position of the valve to be set such that during operation of the vehicle, the control system automatically moves the valve to the desired position when the operating parameter is within the value range, the programming module allows a user to fine tune the value range of the operating parameter via a visual interface.

13. A control system for an exhaust valve of a vehicle, the control system comprising:
    a vehicle interface for determining a live value for an operating parameter of the vehicle;
    a recording module being configured to, upon activation, instantaneously record the live value of the operating parameter;
    a programming module for determining a value range based on the recorded live value and allowing a desired position of the valve to be set such that during operation of the vehicle, the control system automatically moves the valve to the desired position when the operating parameter is within the value range; and
    a geographic module for allowing the desired position of the valve to be set based on a geographic location of the vehicle.

14. The control system of claim 13, wherein the geographic module allows the desired position of the valve position to be set when the vehicle is travelling within a predetermined area.

15. A control system for an exhaust valve of a vehicle, the control system comprising:
    a vehicle interface for determining a live value for an operating parameter of the vehicle;
    a recording module being configured to, upon activation, instantaneously record the live value of the operating parameter;
    a programming module for determining a value range based on the recorded live value and allowing a desired position of the valve to be set such that during operation of the vehicle, the control system automatically moves the valve to the desired position when the operating parameter is within the value range;
    a control software application for receiving and processing the recorded live value of the operating parameter, the live value comprised of a plurality of live values and the operating parameter comprised of one or more operating parameters, the control software application generating operating instructions based on user input;

a mobile device on which the control software application can be installed for operation, the control software application being configured to provide a user interface via the mobile device for receiving user input; and a control circuit module providing the vehicle interface and communicating with the mobile device to relay the one or more operating parameters and receive operating instructions, the control circuit module being configured to generate control signals to drive the valve to the desired position based on the operating instructions.

16. The control system of claim 15, wherein the control circuit module includes a microcontrol system for receiving input signals from the mobile device and the vehicle, processing the input signals based on embedded executable software commands, and generating output signals to the mobile device and to drive the valve.

17. The control system of claim 16, wherein the control circuit module includes a GPS device for determining a geographic location of the valve, the GPS device is on board the control circuit module and provides GPS signals directly to the microcontrol system.

18. A control system for an exhaust valve of a vehicle, the control system comprising:

a vehicle interface for determining a live value for an operating parameter of the vehicle;

a recording module being configured to, upon activation, instantaneously record the live value of the operating parameter;

a programming module for determining a value range based on the recorded live value and allowing a desired position of the valve to be set such that during operation of the vehicle, the control system automatically moves the valve to the desired position when the operating parameter is within the value range; and a diagnostics module for facilitating testing, maintenance, troubleshooting and repair of the control system, wherein the diagnostics module provides functionality to report error status, confirm power failure report external switch state, access user menu settings, access battery system settings, and access vehicle interface communication protocol settings.

19. A control system for an exhaust valve of a vehicle, the control system comprising:

a vehicle interface for determining a live value for an operating parameter of the vehicle;

a recording module being configured to, upon activation, instantaneously record the live value of the operating parameter; and a programming module for determining a value range based on the recorded live value and allowing a desired position of the valve to be set such that during operation of the vehicle, the control system automatically moves the valve to the desired position when the operating parameter is within the value range, the vehicle interface determines the operating parameter from a communications port of the vehicle.

* * * * *